(12) United States Patent
Molina-Estolano et al.

(10) Patent No.: US 9,612,906 B1
(45) Date of Patent: *Apr. 4, 2017

(54) MANAGING DISTRIBUTED SYSTEM PERFORMANCE USING ACCELERATED DATA RETRIEVAL OPERATIONS

(71) Applicant: Quantcast Corporation, San Francisco, CA (US)

(72) Inventors: Esteban Molina-Estolano, Redwood City, CA (US); Silvius V. Rus, Orinda, CA (US)

(73) Assignee: Quantcast Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,387

(22) Filed: May 24, 2016

Related U.S. Application Data

(63) Continuation of application No. 14/038,255, filed on Oct. 22, 2013, now Pat. No. 9,392,060, and a
(Continued)

(51) Int. Cl.
*G06F 15/173* (2006.01)
*G06F 11/10* (2006.01)
*G06F 3/06* (2006.01)

(52) U.S. Cl.
CPC .......... *G06F 11/1088* (2013.01); *G06F 3/064* (2013.01); *G06F 3/067* (2013.01); *G06F 3/0619* (2013.01)

(58) Field of Classification Search
CPC .... G06F 11/1088; G06F 3/0619; G06F 3/064; G06F 3/067
See application file for complete search history.

(56) References Cited

U.S. PATENT DOCUMENTS 6,122,403 A * 9/2000 Rhoads ............ G06F 17/30876
382/233
7,370,336 B2   5/2008 Husain et al.
(Continued)

OTHER PUBLICATIONS

United States Office Action, U.S. Appl. No. 13/763,459, filed Feb. 3, 2015, 28 pages.
(Continued)

*Primary Examiner* — Ario Etienne
*Assistant Examiner* — Andrea Hurst
(74) *Attorney, Agent, or Firm* — Robin W. Reasoner; Renee D. Jacowitz

(57) ABSTRACT

A distributed system is adapted to manage the performance of distributed processes. In one aspect, multiple stripes associated with a data item are stored in a distributed storage. The stored stripes include one or more stripes of redundancy information for the data item. A distributed process including at least one task is performed. During performance of the distributed process, a determination is made as to whether to perform an accelerated data retrieval operation. Responsive to a determination to perform an accelerated data retrieval operation, at least one of the one or more stripes of redundancy information for the data item is requested from the distributed storage. Other stripes associated with the data item may also be requested from the distributed storage. After a sufficient subset of stripes associated with the data item is received, the data item is reconstructed using the subset.

20 Claims, 11 Drawing Sheets

Related U.S. Application Data continuation of application No. 13/763,459, filed on Feb. 8, 2013, now Pat. No. 9,444,889.

(56) References Cited

U.S. PATENT DOCUMENTS

| | | | |
|---|---|---|---|
| 7,430,616 B2 | 9/2008 | Husain et al. | |
| 7,433,941 B1 | 10/2008 | Lavian et al. | |
| 7,434,220 B2 | 10/2008 | Husain et al. | |
| 7,647,451 B1 | 1/2010 | Corbett et al. | |
| 7,660,581 B2 * | 2/2010 | Ramer | G06F 17/30867 455/405 |
| 7,698,289 B2 | 4/2010 | Kazar et al. | |
| 7,751,628 B1 | 7/2010 | Reisman | |
| 7,865,187 B2 * | 1/2011 | Ramer | G06F 17/30867 455/432.3 |
| 7,899,455 B2 * | 3/2011 | Ramer | G06F 17/30867 455/432.3 |
| 7,986,625 B2 | 7/2011 | Chase et al. | |
| 8,023,751 B1 | 9/2011 | Reisman | |
| 8,050,675 B2 * | 11/2011 | Ramer | G06F 17/30867 455/432.2 |
| 8,176,186 B2 * | 5/2012 | McCanne | H03M 7/30 709/228 |
| 8,239,734 B1 | 8/2012 | Shalvi | |
| 8,301,673 B2 | 10/2012 | Hyer, Jr. et al. | |
| 8,340,666 B2 * | 12/2012 | Ramer | G06F 17/30867 455/432.3 |
| 8,351,933 B2 * | 1/2013 | Ramer | G06F 17/30867 455/432.2 |
| 8,422,733 B2 | 4/2013 | Reisman | |
| 8,539,154 B2 | 9/2013 | Jaquette | |
| 8,645,636 B2 | 2/2014 | Jaquette | |
| 8,666,109 B2 | 3/2014 | Hubner et al. | |
| 8,683,095 B1 | 3/2014 | Ni et al. | |
| 8,694,729 B2 | 4/2014 | Jaquette | |
| 8,700,561 B2 | 4/2014 | Ahuja et al. | |
| 8,768,946 B2 | 7/2014 | Jaquette | |
| 8,873,390 B2 | 10/2014 | Chase et al. | |
| 9,412,367 B2 * | 8/2016 | Gazdzinski | G06Q 30/0251 |
| 9,477,412 B1 * | 10/2016 | Amar | G06F 3/0611 |
| 2002/0157113 A1 | 10/2002 | Allegrezza | |
| 2003/0154246 A1 | 8/2003 | Ollikainen | |
| 2004/0068612 A1 | 4/2004 | Stolowitz | |
| 2004/0098458 A1 | 5/2004 | Husain et al. | |
| 2004/0098717 A1 | 5/2004 | Husain et al. | |
| 2004/0098728 A1 | 5/2004 | Husain et al. | |
| 2004/0098729 A1 | 5/2004 | Husain et al. | |
| 2004/0104927 A1 | 6/2004 | Husain et al. | |
| 2004/0107420 A1 | 6/2004 | Husain et al. | |
| 2004/0109410 A1 | 6/2004 | Chase et al. | |
| 2005/0060432 A1 | 3/2005 | Husain et al. | |
| 2005/0081091 A1 | 4/2005 | Bartfai et al. | |
| 2005/0192932 A1 | 9/2005 | Kazar et al. | |
| 2007/0260728 A1 | 11/2007 | Noble | |
| 2008/0115017 A1 | 5/2008 | Jacobson | |
| 2008/0320151 A1 * | 12/2008 | McCanne | H03M 7/30 709/228 |
| 2009/0055682 A1 | 2/2009 | Gibson et al. | |
| 2010/0061662 A1 | 3/2010 | Hubner et al. | |
| 2011/0066754 A1 | 3/2011 | Stryker et al. | |
| 2012/0002951 A1 | 1/2012 | Reisman | |
| 2012/0078931 A1 | 3/2012 | Jaquette | |
| 2012/0079184 A1 | 3/2012 | Jaquette | |
| 2012/0079191 A1 | 3/2012 | Jaquette | |
| 2012/0112907 A1 | 5/2012 | Flath | |
| 2012/0239691 A1 | 9/2012 | Jaquette | |
| 2012/0311271 A1 | 12/2012 | Klein et al. | |
| 2013/0132601 A1 | 5/2013 | El-Beltagy et al. | |
| 2013/0246334 A1 | 9/2013 | Ahuja et al. | |
| 2013/0246335 A1 | 9/2013 | Ahuja et al. | |
| 2013/0246336 A1 | 9/2013 | Ahuja et al. | |
| 2013/0246431 A1 | 9/2013 | Ahuja et al. | |
| 2013/0318131 A1 | 11/2013 | Reisman | |
| 2013/0326144 A1 | 12/2013 | Jaquette | |
| 2013/0345844 A1 | 12/2013 | Reisman | |
| 2013/0347026 A1 | 12/2013 | Reisman | |
| 2014/0068608 A1 | 3/2014 | Kulkarni | |
| 2014/0164314 A1 | 6/2014 | Ahuja et al. | |
| 2014/0189421 A1 * | 7/2014 | Werner | G06F 11/2056 714/6.21 |
| 2014/0250129 A1 | 9/2014 | Jaquette | |
| 2014/0281350 A1 * | 9/2014 | Lango | G06F 3/0665 711/203 |
| 2015/0106616 A1 * | 4/2015 | Nix | H04W 52/0235 713/156 |
| 2017/0017401 A1 * | 1/2017 | Grube | G06F 11/1076 |

OTHER PUBLICATIONS

United States Office Action, U.S. Appl. No. 13/763,459, filed Sep. 11, 2015, 23 pages.

United States Office Action, U.S. Appl. No. 14/038,255, Oct. 26, 2015, 15 pages.

United States Office Action, U.S. Appl. No. 14/038,255, Mar. 26, 2015, 27 pages.

United States Advisory Action, U.S. Appl. No. 14/038,255, Mar. 17, 2016, 3 pages.

\* cited by examiner

MANAGING DISTRIBUTED SYSTEM PERFORMANCE USING ACCELERATED DATA RETRIEVAL OPERATIONS

CROSS-REFERENCE TO RELATED APPLICATIONS

This application is a continuation of U.S. Non-Provisional application Ser. No. 14/038,255 entitled "Managing Distributed System Performance Using Accelerate Data Retrieval Operations" by Silvius V. Rus et al., filed on Oct. 22, 2013 which is a continuation of U.S. Non-Provisional application Ser. No. 13/763,459 entitled "Managing Distributed System Performance Using Accelerate Data Retrieval Operations", by Silvius V. Rus et al., filed on Feb. 8, 2013, which are both incorporated by reference herein in their entirety.

BACKGROUND

1. Technical Field

This invention pertains to distributed systems, and in particular to methods of managing the performance of distributed systems using accelerated data retrieval operations.

2. Description of Related Art

Many modern distributed systems perform distributed processing by employing hundreds or thousands of interconnected (e.g., networked) computing devices. In one aspect, such systems typically segment distributed processes into multiple tasks of execution. Performance of each task may then be facilitated by one or more of the interconnected computing devices.

One problem with such processing is that distributed processes are only able to complete once their slowest tasks of execution finish. Thus, distributed processes often encounter serious performance issues where certain tasks take a disproportionally long amount of time to complete. Many times, such "straggler" tasks are not the result of task complexity, but rather a resource-related issue, such as hardware performance limitations, hardware contention issues, hardware failure, etc. For example, a task may require an item of data (e.g., file) stored by a failing storage device. As a result, retrieving the item of data may require a significant amount of time, which adversely impacts the speed at which the task may be performed. Due to the aforementioned problem, distributed processes often require more time than necessary to complete. As a consequence, modern systems frequently exhibit poor performance levels over time.

SUMMARY

Embodiments of the invention include a method, a non-transitory computer readable storage medium and a system for managing the performance of distributed systems using accelerated data retrieval operations.

Embodiments of the method include storing multiple stripes associated with a data item in a distributed storage. The stripes may have been generated according to a suitable coding scheme, such as the Reed-Solomon error correction coding scheme or a scheme based on Shamir's secret sharing algorithm. A distributed process including at least one task is performed. During performance of the distributed process, a determination is made as to whether to perform an accelerated data retrieval operation with respect to the at least one task based at least in part on performance information associated with the at least one task. Responsive to a determination to perform an accelerated data retrieval operation, a number of stripes greater than the minimum number of stripes required to reconstruct the data item is requested from the distributed storage. After a sufficient subset of stripes associated with the data item is received, the data item is reconstructed using the subset.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
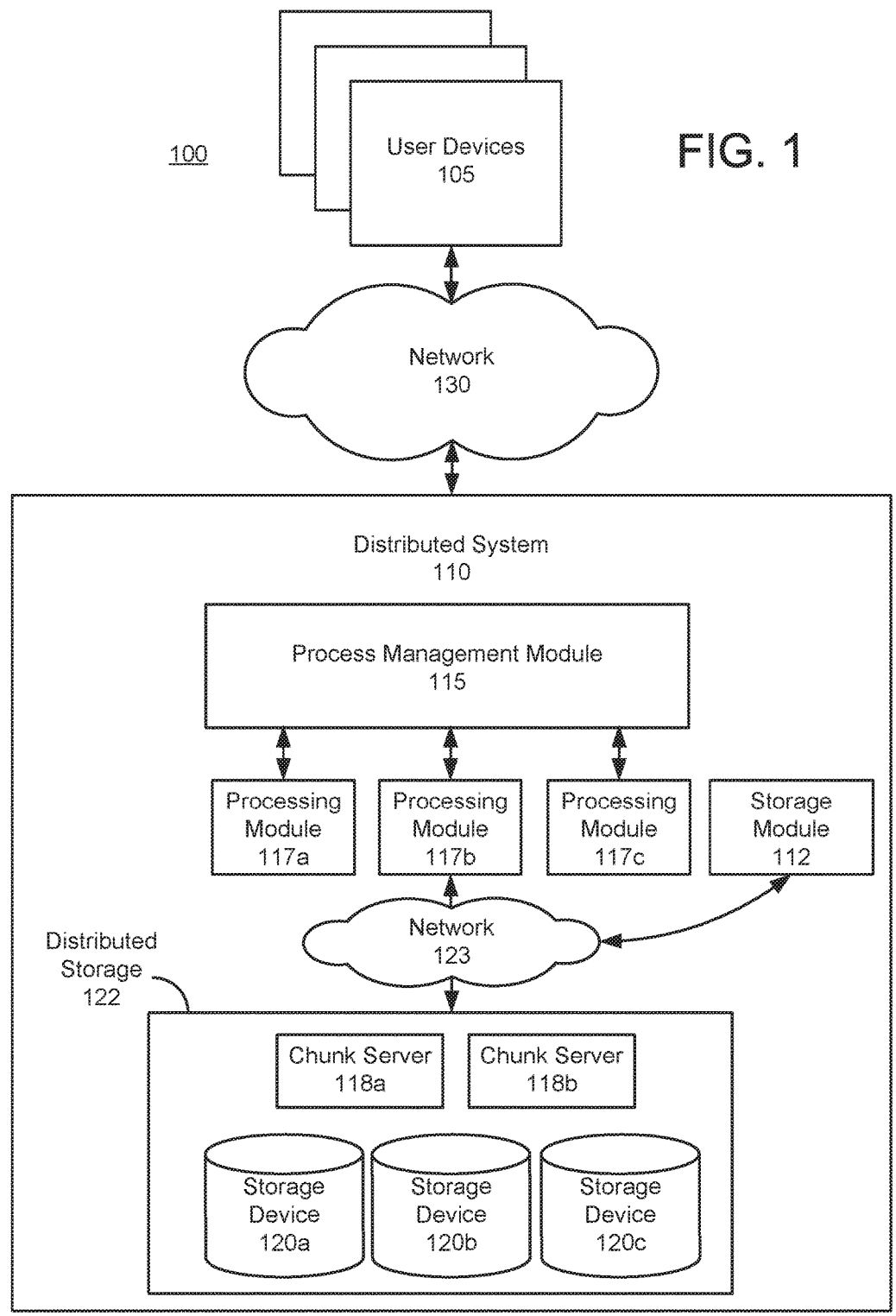
FIG. 1 is a high-level block diagram of a computing environment for managing performance of a distributed system according to one embodiment.

FIG. 1 is a high-level block diagram of a computing environment 100 for managing the performance of a distributed system in accordance with an embodiment of the invention. As shown in FIG. 1, the computing environment 100 includes user devices 105 and a distributed system 110 communicating with one another via the network 130.

The network 130 enables communications between the user devices 105 and the distributed system 110. In one embodiment, the network 130 uses standard communications technologies and/or protocols, and may comprise the Internet. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The user devices 105 are electronic devices used by users to transmit processing requests to the distributed system 110 via the network 130. Each processing request indicates to the distributed system 100 to perform one or more distributed processes. The user devices 105 additionally receive processing results generated by performance of the distributed processes from the distributed system 110 via the network 130.

In one aspect, each of the user devices 105 may be a suitable computing device. For example, an individual user device 105 may be a desktop computer system, laptop, workstation, or server. An individual user device 105 may also be a mobile computing device, such as a smartphone, tablet device, portable gaming device, e-reading device, personal digital assistant (PDA), etc. In one aspect, the user devices 105 each execute a suitable operating system, such as Android, Apple iOS, a Microsoft Windows-compatible operating system, Apple OS X, UNIX, and/or a Linux distribution. The user device 105 may further execute suitable software applications, such as a web browser (e.g., Google Chrome, Microsoft Internet Explorer, Apple Safari, Mozilla Firefox, etc.), a native application (e.g., Microsoft Word for the Windows Operating System), etc.

The distributed system 110 performs distributed processes responsive to processing requests received from the user devices 105 via the network 130. The distributed system 110 additionally provides processing results generated by performance of the distributed processes to the user devices 105 via the network 130. As shown in FIG. 1, the distributed system 110 includes a distributed storage 122, a storage module 112, a process management module 115, processing modules 117, and a network 123.

The network 123 enables communications between the distributed storage 122, the storage module 112, and the processing modules 117. The network 123 may be similar to the network 130. In particular, the network 123 may use standard communications technologies and/or protocols, and may comprise the Internet. For example, the network 123 can include links using technologies such as Ethernet, 802.11, etc.

The distributed storage 122 stores data of the distributed system 110, and enables retrieval of the stored data. In particular, the distributed storage 122 may store various data items, such as database files, temporary files, spreadsheets, files used for processing, software applications, and/or the like received from the storage module 112. The distributed storage 122 may additionally enable other entities of the distributed system 110 to retrieve the stored data items. As shown in FIG. 1, the distributed storage 122 includes one or more interconnected storage devices 120 and one or more chunk servers 118.

The storage devices 120 are devices adapted to store various data items of the distributed system 110. In one aspect, the storage devices 120 store each data item as a set of "stripes" or portions usable for computing checksums and/or performing other recovery mechanisms. At least some of the stripes may be retrieved and merged to reconstruct the data item. In one aspect, the stripes are generated according to a suitable coding scheme, such as such as the Reed-Solomon error correction coding scheme or a scheme based on Shamir's secret sharing algorithm. In some embodiments, each of the stripes may be of the same type, such as those stripes generated using Shamir's secret sharing algorithm. In other embodiments, different stripes may have different types, such as those stripes generated by the Reed-Solomon error correction coding scheme. In such embodiments, at least some of the stripes for a data item include the data for the data item. Such types of stripes may be referred to as "data stripes." At least some other stripes for the data item include redundancy information (e.g., parity data) for the data item. Such stripes may be referred to as "redundancy stripes." The redundancy stripes may enable the data item to be reconstructed in instances where the entirety of the data stripes is not accessible.

In one embodiment, the stripes of a particular data item may be stored in different storage devices 120. In one aspect, the stripes may be stored in a manner that enables a high level of data recoverability and accessibility. For example, the stripes may be stored in storage devices 120 situated in different network racks, in different buildings, in different data centers, etc. Thus, an incident affecting one stripe, such as a loss of power to a particular network rack, is unlikely to also affect accessibility of the other stripes.

In one aspect, the storage devices 120 are operated as a single logical entity despite being separate physical devices. The storage devices 120 may be located in the same network racks, in different network racks located in the same geographic location (e.g., within the same building or data center), and/or located across different geographic locations (e.g., within various buildings or data centers located in different cities or countries). The storage devices 120 may additionally be interconnected in any suitable manner, such as over a backplane connection, over a suitable network connection, etc.

In one aspect, each of the storage devices 120 is a suitable storage device, such as a magnetic-based hard drive, a flash-based storage device (e.g., a NAND based solid state hard drive), an optical storage device, a storage device based on random access memory, and/or the like. In one embodiment, the storage devices 120 are each the same type of storage device and have similar device characteristics. In another embodiment, the storage devices 120 are diverse storage devices having varying device characteristics (e.g., different bandwidths, etc.).

The chunk servers 118 each manage the operations of one or more of the storage devices 120. For example, the chunk server 118a may store any stripes received for storage in those storage devices (e.g., the storage devices 120a and 120b) managed by the chunk server 118a. Likewise, the chunk server 118b may store any stripes received for storage in those storage devices (e.g., the storage device 120c) managed by the chunk sever 118b. The chunk servers 118a and 118b may also be configured to retrieve any requested stripes from those storage devices 120 managed by the chunk servers 118a and 118b. In one aspect, the chunk servers 118 further periodically monitor the performance levels of their associated storage devices 120. In particular, the chunk servers 118 may periodically measure the current bandwidth of the storage devices 120. For example, the chunk servers 118 may measure the amount of data the storage devices 120 are able to retrieve responsive to requests for data over a predefined period, such as five, ten, or twenty seconds. Based on the measurements, the chunk servers 118 may determine current bandwidths for the storage devices 120. Illustratively, the chunk servers 118 may determine that a particular storage device 120 has a current bandwidth of 5 MB/s. Such data retrieval performance information may then be provided to a suitable entity, such as the processing modules 117.

The storage module 112 facilitates storage of data in the distributed storage 122. In one aspect, the data may have been received from the user devices 105 and/or generated by the distributed system 110. To facilitate storage of an item of data, the storage module 112 generates one or more stripes for the data item, and provides each data stripe to the distributed storage 122 for storage in one or more storage devices 120. In one embodiment, generation of the stripes for a data item is performed according to a suitable coding scheme. For example, the storage module 112 may generate stripes according to the Reed-Solomon error correction coding scheme or a scheme based on Shamir's secret sharing algorithm. In one example of a particular implementation of the Reed-Solomon error correction coding scheme, six data stripes and three redundancy stripes are generated for a data item. Any combination of six of the nine different stripes can later be used to reconstruct an item of data according to the scheme. It will be appreciated that other implementations of the Reed-Solomon error correction coding scheme may be used. Such implementations may utilize different numbers of data stripes and different numbers of redundancy stripes.

In one embodiment, the storage module 112 may furthermore provide multiple copies of the stripes of a data item to the distributed storage 122 for storage in the storage devices 120. For example, the storage module 112 may provide five copies of six data stripes (for a total of thirty data stripes) for storage in multiple storage devices 120. The storage module 112 may furthermore provide two copies of three redundancy stripes (for a total of six redundancy stripes) for storage in multiple storage devices 120.

The process management module 115 manages the execution of one or more distributed processes. In particular, the process management module 115 divides or segments a distributed process into one or more tasks. The process management module 115 thereafter assigns each task to one or more of the processing modules 117 for performance of the task. In one embodiment, the process management module 115 further manages the performance of a distributed process by initiating accelerated data retrieval operations. More specifically, the process management module 115 periodically evaluates the performance levels of the tasks of the distributed process. Responsive to a determination that the performance levels of one or more of the tasks are below a certain threshold performance level due to a resource-related problem (e.g., a slow storage device 120), the process management module 115 selects at least some of such "straggler" tasks for accelerated data retrieval. As used herein, a straggler task refers to a task that has a poor performance level due to a resource-related problem.

In one embodiment, the process management module 115 indicates to the processing modules 117 performing the selected straggler tasks to retrieve greater than the minimum number of stripes needed to reconstruct the data item when performing a retrieval of the data item. Hence, in instances where a stripe of an item of data is stored on a poorly performing resource, a processing module 117 may still timely receive a sufficient number of stripes from better performing resources to reconstruct the item of data. As a result, sluggish task performance due to poorly performing resources can be avoided.

The processing modules 117 receive and process tasks from the process management module 115. In processing a particular task, an individual processing module 117 may retrieve data required by the task from the distributed storage 122. In one embodiment, an individual processing module 117 may receive, from the process management module 115, an indication to use accelerated data retrieval for a particular task performed by the processing module 117. Responsive to the indication, the processing module 117 automatically retrieves, for any data item required by the task, greater than the minimum number of stripes required to reconstruct the data item. Upon receiving a sufficient number of stripes, the processing module 117 reconstructs the data item, and performs processing using the reconstructed data item.

By initiating accelerated data retrieval operations in the manner described, the distributed system 100 can quickly and efficiently perform distributed processes. Specifically, by retrieving greater than the minimum number of stripes needed to reconstruct a data item, the distributed system 110 is able to reconstruct the data item after receiving a subset of the stripes. As a result, performance of a task using the data item is less likely to be bound by slow retrieval of some of a data item's stripes. Hence, the distributed system 100 may perform the task with fewer resource-related delays, which enables the distributed process associated with the task to be completed in a timely manner.

It will be appreciated that while only three user devices 105, three storage devices 120, two chunk servers 118, and three processing modules 117 are shown in FIG. 1, those of skill in the art will recognize that typical environments can have hundreds, thousands, millions, or even billions of user devices 105, storage devices 120, chunk servers 118, and/or processing modules 117. Furthermore, while the environment 100 shows the process management module 115 and the processing modules 117 as separate entities within the distributed system 110, some embodiments may combine one or more functionalities of the process management module 115 and the processing modules 117 into the same physical entity.

System Architecture

Figure 2:
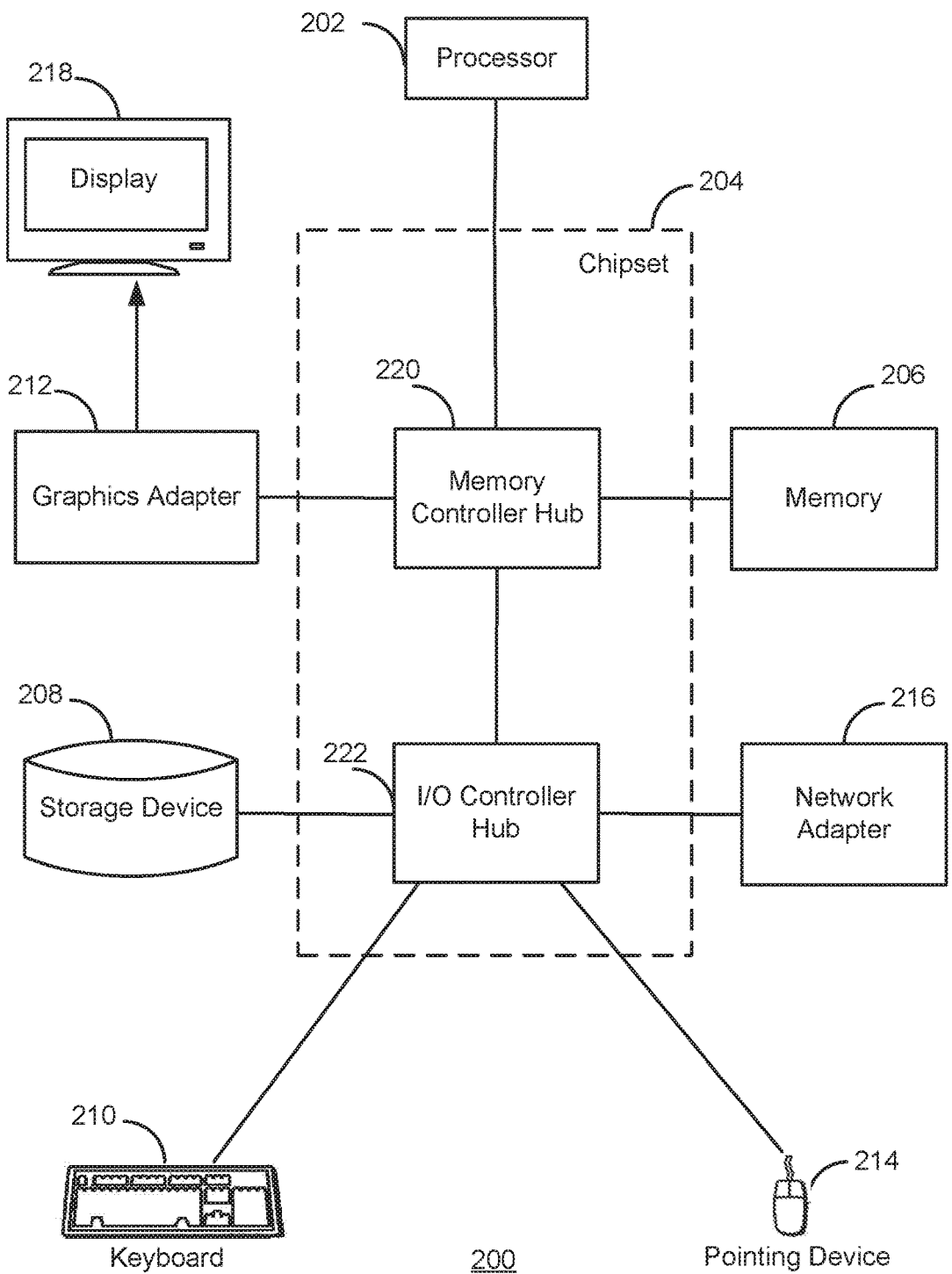
FIG. 2 is a high-level block diagram of a computer system for managing performance of a distributed system according to one embodiment.

FIG. 2 is a high-level block diagram of a computer 200 for use as the user devices 105 or the distributed system 110 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of to the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 130.

As is known in the art, a computer 200 can have different and/or other components than those shown in FIG. 2. In addition, the computer 200 can lack certain illustrated components. In one embodiment, a computer 200 acting as the distributed system 110 is formed of multiple spatially and/or time distributed blade computers and lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Process Management Module Overview

Figure 3A:
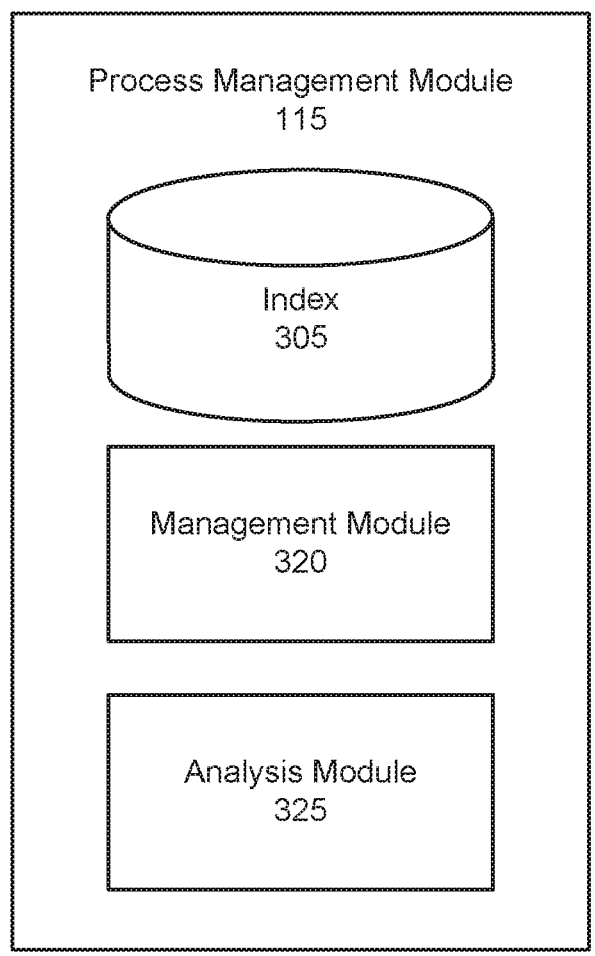
FIG. 3A is a high-level block diagram illustrating a detailed view of modules within a process management module according to one embodiment.

FIG. 3A is a high-level block diagram illustrating a detailed view of modules within the process management module 115 according to one embodiment. Some embodiments of the process management module 115 have different and/or other modules than the ones described herein. Similarly, the functions can be distributed among the modules in accordance with other embodiments in a different manner than is described here. Likewise, the functions can be performed by other entities.

The index 310 includes information regarding one or more distributed processes managed by the process management module 115. Specifically, the index 310 may include identification information for each distributed process, such as a uniquely assigned identifier for the distributed process. The information may further include information identifying the tasks of the distributed process, and the processing modules 117 performing the tasks.

The management module 320 manages the execution of one or more distributed processes. In particular, the management module 320 receives requests to execute a distributed process from a requesting user device 105. Upon receiving the request, the management module 320 divides the distributed process into one or more discrete tasks. For example, the management module 320 may divide a distributed process into hundreds or thousands of tasks. Thereafter, the management module 320 assigns the tasks to one or more processing modules 117 to perform the tasks. The management module 320 additionally updates the index 310 to include information regarding the distributed process, the different tasks of the distributed process, and the processing modules 117 performing the tasks. Upon completion of each task, the management module 320 receives processing results from the processing modules 117. The management module 320 then merges the processing results in a suitable manner, and provides the merged processing results to the requesting user device 105.

The analysis module 325 facilitates acceleration of the data retrieval of one or more tasks performed by the processing modules 117. Specifically, during performance of the tasks of a distributed process, the analysis module 325 requests information regarding the performance levels associated with the tasks performed by the processing modules 117 from the modules 117. Responsive to the request, the analysis module 325 receives information regarding the performance level associated with each task. For example, the analysis module 325 may receive information indicating that the current processing speed of a task is 30 MB/s. In addition, the analysis module 325 may additionally receive information indicating whether the performance levels of the each task is being affected by one or more poorly performing storage devices 120. Furthermore, the analysis module 325 may receive information regarding the network traffic loads of local portions of the network 123 connected to the processing modules 117 performing the tasks. For example, each of the processing modules 117 may provide information regarding the measured traffic load of a portion of the network 123 connected to and within the same data center as the processing module 117.

Based on the aforementioned information, the analysis module 325 identifies candidate straggler tasks for which accelerated data retrieval is to be used. To identify the candidate straggler tasks, the analysis module 325 identifies an initial set of tasks. Each task in the initial set may have a reported performance level below a threshold performance level, where the performance level of the task is reported as being impacted by a poorly performing storage device 120. In one embodiment, the analysis module 325 computes the threshold performance level based on the average reported performance levels of the tasks of the distributed process. For example, the analysis module 325 may sum the reported performance levels for all or a representative sample of the tasks and divide the sum by the number of tasks to obtain the average performance level. Thereafter, the analysis module 325 sets the threshold performance level to be a particular percentage or some other value below the average performance level of the tasks.

For each task indentified for the initial set, the analysis module 325 determines whether accelerated data retrieval can be supported for the task. In particular, because accelerated data retrieval requires retrieval of additional stripes, the analysis modules 325 determines whether a local portion of the network 123 connected to the processing module 117 performing the task can support additional network traffic. To determine whether the portion of the network 123 can support additional traffic, the analysis module 325 determines whether the reported network traffic load of the portion of the network 123 is below a predefined threshold traffic load level. For example, a threshold traffic load level may be equal to 15% of network capacity. Thus, the analysis module 325 determines whether the portion of the network 123 has a current reported load below 15% of network capacity. If the reported network traffic load of the portion of the network 123 is below the threshold traffic load level, the analysis module 325 determines that accelerated data retrieval can be supported for the task.

Those tasks in the initial set for which accelerated data retrieval may be supported are identified as candidate straggler tasks. From the candidate straggler tasks, the analysis module 325 selects one or more tasks for data retrieval acceleration. In one embodiment, the analysis module 325 is limited to selecting a threshold number or percentage of the candidate straggler tasks for data retrieval acceleration. For example, the analysis module 325 may be limited to selection of 20% of the candidate straggler tasks. As another example, the analysis module 325 may be limited to selection of 75 of the candidate straggler tasks.

The analysis module 325 may select candidate straggler tasks in any suitable manner. In one embodiment, the analysis module 325 selects candidate straggler tasks having the lowest reported performance levels. In other embodiments, the analysis module 325 selects candidate straggler tasks using a suitable random or pseudo-random selection algorithm. Upon selecting the candidate straggler tasks, the analysis module 325 indicates to the processing modules 117 performing the selected candidate straggler tasks to use accelerated data retrieval for the tasks.

In one embodiment, the analysis module 325 additionally automatically accelerates data retrieval for all uncompleted tasks regardless of performance level after a threshold number or percentage of the tasks of the distributed process have finished. For example, the analysis module 325 may indicate to all processing modules 117 still performing tasks to accelerate data retrieval after more than 99% of the tasks of the distributed process have finished. In this way, task performance can be improved during periods where usage of the network 123 is likely to be low (and where the network 123 is likely to be able to support accelerated data retrieval) as a result of most tasks being finished.

In one embodiment, the analysis module 325 may facilitate performance of accelerated data retrieval in conjunction with performance of one or more speculative tasks. As used herein, a speculative task is a replica of another task (referred to as an "original" task). For example, the speculative task may include the same set of instructions as a corresponding original task. In one aspect, a speculative task is performed by a processing module 117 that is different from the processing module 117 performing a corresponding original task. The speculative task may additionally use different copies of stripes than the corresponding original task. By having multiple processing modules 117 performing the same processing, slower processing modules 117 and/or storage devices 120 are less likely to impact the performance of a distributed process. In one aspect, initiating speculative tasks increases the network traffic load of the network 123 as more copies of data items are needed to be retrieved from the storage devices 120 over the network 123.

In one embodiment, the analysis module 325 employs a progressive approach for facilitating the performance of accelerated data retrieval in conjunction with the performance of one or more speculative tasks. Specifically, the analysis module 325 progressively applies a different and more effective measure for improving the performance of one or more tasks. In particular, the analysis module 325 causes one or more processing modules 117 to perform accelerated data retrieval for tasks identified as performing below the threshold performance level. After a period of time, the analysis module 325 determines whether the performance levels for the identified tasks are now above the threshold performance level. For those tasks that are not performing above the threshold performance level, the analysis module 325 causes one or more speculative tasks to be initiated for the tasks. After another period of time, the analysis module 325 determines whether the performance levels of the speculative tasks are above the threshold performance level. For those speculative tasks that are not performing above the threshold performance level, the analysis module 325 indicates to the processing modules 117 performing the speculative tasks to use accelerated data retrieval for the speculative tasks. In one aspect, each described successive measure causes progressively larger network traffic loads over the network 123. Thus, by employing the progressive approach in the manner described, the analysis modules 325 is able to use an appropriate measure for improving task performance levels without inundating the network 123 with unnecessary traffic.

In another embodiment, the analysis module 325 employs a priority based approach for facilitating the performance of accelerated data retrieval in conjunction with the performance of one or more speculative tasks. In particular, the analysis module 325 selects different combinations of accelerated data retrieval operation and speculative task performance based on the priorities of the tasks of a distributed process. Specifically, different tasks may be assigned different priority levels in a suitable manner (e.g., by an administrator of the distributed system 110 or automatically by the analysis module 325 based on predefined criteria). During operation, the analysis module 325 then determines the priority of each task. For a task with a high or critical priority, the analysis module 325 generates one or more speculative tasks for the task. Furthermore, the analysis module 325 indicates to the processing modules 117 performing the speculative tasks or the original task to use accelerated data retrieval. Thus, the probability of the task completing without significant resource-related delays can be increased. For a task assigned a less critical priority, the analysis module 325 may (1) have the task performed using normal data retrieval operations and without speculative tasks being generated for the task, (2) have the task performed using accelerated data retrieval operations and without speculative tasks being generated for the task, or (3) have speculative tasks generated for the task, where the speculative tasks and the original task are performed using normal data retrieval operations. By employing the priority based approach, critical tasks of a distributed process can be completed quicker. Furthermore, since critical tasks are typically few in number, improving the performance of the critical tasks in the manner described does not cause oversubscription of the network 123.

Processing Module Overview

Figure 3B:
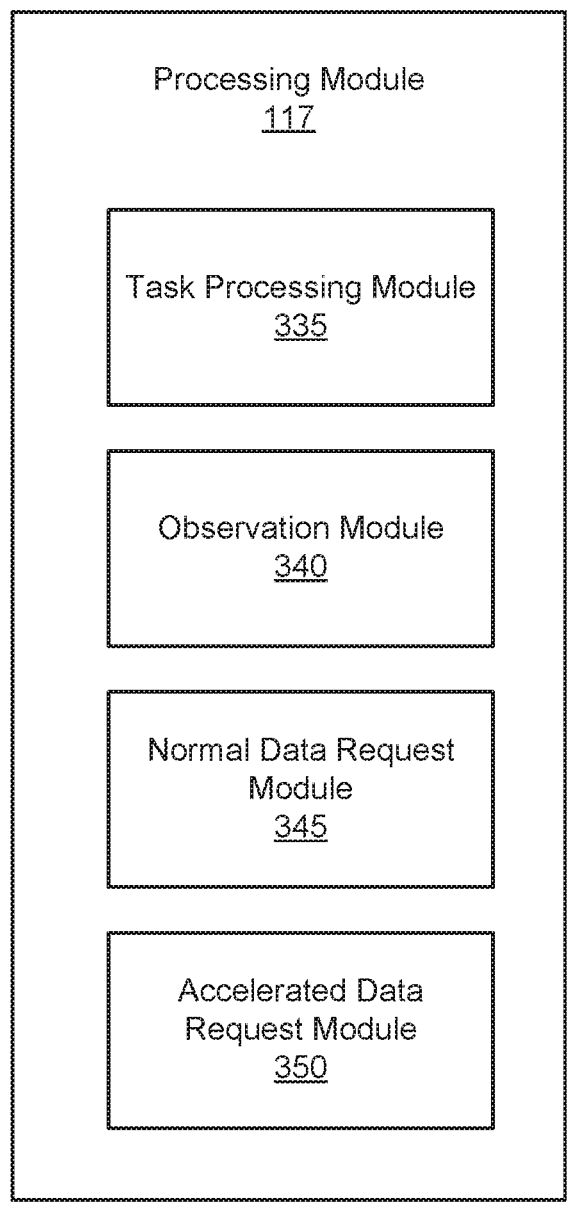
FIG. 3B is a high-level block diagram of modules within a processing module according to one embodiment.

FIG. 3B is a high-level block diagram illustrating a detailed view of modules within a processing module 117 according to one embodiment. Some embodiments of the processing module 117 have different and/or other modules than the ones described herein. Similarly, the functions can be distributed among the modules in accordance with other embodiments in a different manner than is described here. Likewise, the functions can be performed by other entities.

The task processing module 335 performs tasks assigned by the process management module 115 in order to generate processing results. In one aspect, each task includes one or more sub-tasks to be performed. The task processing module 335 may perform the sub-tasks in any suitable order, including in parallel and/or in sequential order. In one aspect, one or more of the sub-tasks may include various instructions for processing data items stored by the storage devices 120 of the distributed storage 122. To process the stored data items, the task processing module 335 provides data requests to either the normal data request module 345 or the accelerated data request module 350. Specifically, for a given task, the task processing module 335 provides data requests to the normal data request module 345 while performing normal data retrieval operations. In particular, the task processing module 335 may provide data requests to the normal data request module 345 as the default in processing a particular task. In one aspect, the task processing module 335 switches to providing data requests to the accelerated data request module 350 for a particular task after receiving an indication from the process management module 115 to perform accelerated data retrieval for the task. In one aspect, after providing a data request to either the normal data request module 345 or the accelerated data request module 350, the task processing module 335 receives the requested item of data from the normal data request module 345 or the accelerated data request module 350. Following receipt of the item of data, the task processing module 335 processes the item of data and provides processing results to the process management module 115.

The observation module 340 provides performance information to the process management module 115. In particular, the observation module 340 receives a request for performance information for a particular task performed by the processing module 117. Based on the request, the observation module 340 obtains information regarding the performance level of the task. The observation module 340 may obtain the performance level of the task in any suitable manner. For example, the observation module 340 may measure the amount of data processed by the processing module 117 for the task over a predefined period of time, such as over a five, ten, or twenty second time period. The observation module 340 then provides the performance level of the task to the process management module 115.

In one embodiment, the observation module 340 additionally sends a request to the distributed storage 122 for data retrieval performance information for one or more storage devices 120 from which the processing module 117 has accessed data. Responsive to the request, the observation module 340 receives data retrieval performance information for the one or more storage devices 120 from the distributed storage 122. The data retrieval performance information may indicate current performance levels for the storage devices 120. For example, the data retrieval performance information may indicate that a particular storage device 120 has a current performance level of 5 MB/s. After receiving the data retrieval performance information, the observation module 340 determines whether the data retrieval performance levels are below a predefined threshold data retrieval performance level. If the data retrieval performance level of at least one of the storage devices 120 is below the threshold data retrieval performance level, the observation module 340 indicates to the process management module 115 that the performance of the task is being impacted by a poorly performing storage device 120.

In one aspect, the observation module 340 furthermore provides information regarding the network traffic load of a portion of the network 123 connected to the processing module 117. In particular, the observation module 340 may measure the network traffic load over a local portion of the network 123 connected to the processing module 117. For example, the observation module 340 may measure the traffic load of the portion of the network 123 directly connected to a network rack including the processing module 117, the portion of the network 123 within the same physical data center as the processing module 117, etc. In one aspect, the observation module 340 measures the network traffic load over a suitable predefined time period. For example, the observation module 340 may measure network traffic load over a five, ten, or twenty second period. After measuring the network traffic load, the observation module provides the network traffic load to the process management module 115.

The normal data request module 345 retrieves data from the distributed storage 122 using normal data retrieval operations. In one aspect, the normal data request module 345 receives a data request from the task processing module 335. The received data request may indicate a particular item of data to be retrieved. Responsive to the request, the normal data request module 345 requests the particular item of data from the distributed storage 122, where the request indicates that a minimum number of stripes needed to reconstruct the data item be retrieved. The normal data request module 345 thereafter responsively receives one or more stored stripes for the particular item of data from the distributed storage 122 via the network 123. Upon receiving the stripes, the normal data request module 345 reconstructs the item of data using the stripes, and provides the item of data to the normal data request module 345 for processing.

The accelerated data request module 350 retrieves data from the distributed storage 122 using accelerated data retrieval operations. In one aspect, the accelerated data request module 350 receives a data request for a data item from the task processing module 335. Responsive to the request, the accelerated data request module 350 automatically requests greater than a number of stripes needed to reconstruct the item of data from the distributed storage. For example, in one embodiment, the accelerated data request module 350 requests both the data and redundancy stripes of the requested item from the distributed storage 122. In some embodiments, multiple copies of the stripes of an item of data may be stored by distributed storage 122. For example, in one embodiment, the distributed storage 122 may store three copies of each of the stripes of an item of data. In the embodiment, the accelerated data request module 350 requests one or more of the copies of the stripes of the item of data from the distributed storage 122.

After sending the request, the accelerated data request module 350 receives various stripes via the network 123. Following receipt of an individual stripe, the accelerated data request module 350 determines whether a sufficient number of stripes have been received to reconstruct the item of data. If a sufficient number of stripes have been received, the accelerated data request module 350 reconstructs the item of data, and provides the item of data to the task processing module 335.

As a specific example of accelerated data retrieval, the stripes of a data item and stripes of the redundancy information for the data item may have been generated based on the Reed-Solomon error correction coding scheme. In the scheme, any combination of at least six of nine stripes is needed to reconstruct an item of data. Thus, after requesting the stripes of the data item, the accelerated data request module 350 determines whether at least six different stripes have been received. If four different data stripes, and two different redundancy stripes of the data item have been received, the accelerated data request module 350 determines that a sufficient number of stripes have been received. Thereafter, the accelerated data request module 350 reconstructs the item of data and provides the item of data to the task processing module 335.

Figure 4A:
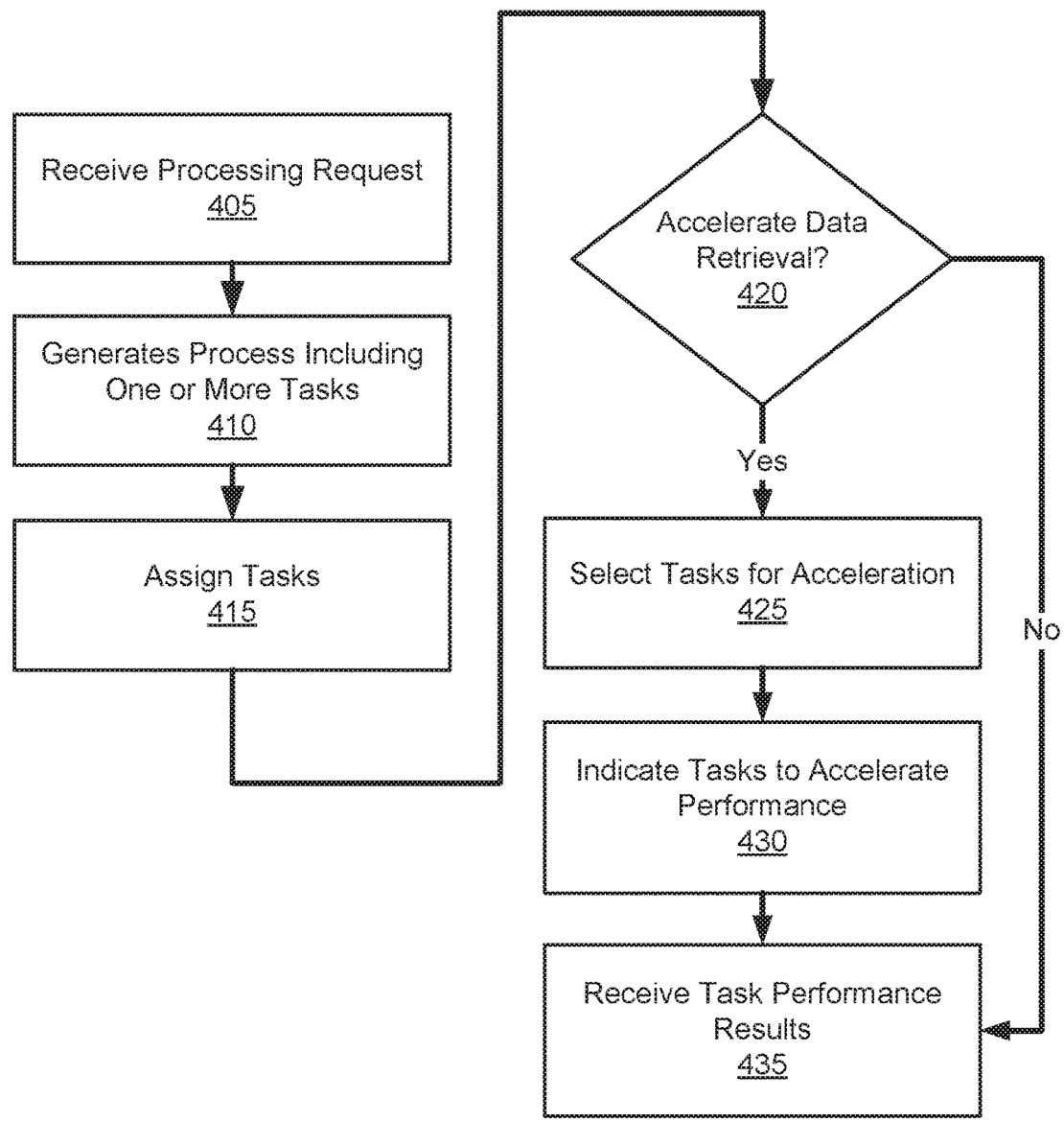
FIG. 4A is a flow chart illustrating a method for managing performance of a distributed system performed by a process management module according to one embodiment.

Method for Managing the Performance of a Distributed System Using Redundancy Information FIG. 4A is a flowchart illustrating a method for managing the performance of a distributed system performed by the process management module 115 according to one embodiment. Other embodiments can perform the steps of the method in different orders and can include different, additional and/or fewer steps. Likewise, multiple instances of the steps may be performed in parallel.

In the method, the process management module 115 receives 405 a processing request to perform a distributed process from a user device 105. Responsive to the request, the process management module 115 generates 410 a distributed process based on the request. The process may include one or more discrete tasks. Thereafter, the process management module 115 assigns 415 the tasks of the distributed process to one or more processing modules 117. During performance of the distributed process, the process management module 115 obtains performance information from the processing modules 117 performing the tasks. The process management module 115 additionally obtains network traffic load information from the processing modules 117. Based on the obtained information, the process management module 115 determines 420 whether to accelerate data retrieval for at least some of the tasks. If the process management module 115 determines to accelerate data retrieval for at least some of the tasks, the process management module 115 selects 425 one or more tasks for which data retrieval performance is to be accelerated. After selecting the tasks, the process management module 115 indicates 430 to the processing modules 117 performing the selected tasks to accelerate data retrieval performance of the tasks. For example, the process management module 115 indicates to the processing modules 117 to concurrently obtain both the stripes of an item of data to be processed for the task and stripes of the redundancy information for the data item. The process management module 115 may additionally initiate speculative tasks for some tasks. The process management module 115 may furthermore indicate to the processing module 117 performing the speculative tasks to perform accelerated data retrieval. At a later time, the process management module 115 receives 435 processing results generated through performance of the tasks from the processing modules 117. The process management module 115 may merge the processing results and provide the results to the requesting user device 105.

Figure 4B:
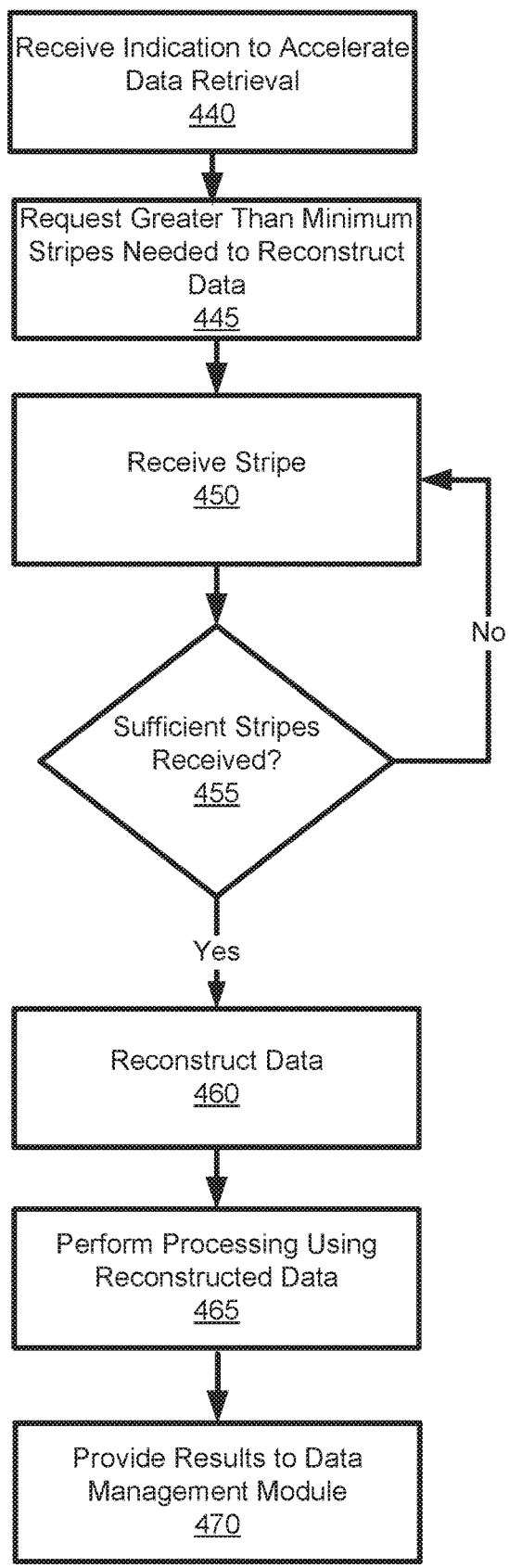
FIG. 4B is a flow chart illustrating a method for managing performance of a distributed system performed by a processing module according to one embodiment.

FIG. 4B is a flowchart illustrating a method for managing the performance of a distributed system performed by a processing module 117 according to one embodiment. Other embodiments can perform the steps of the method in different orders and can include different, additional and/or fewer steps. Likewise, multiple instances of the steps may be performed in parallel.

In the method shown in FIG. 4B, the processing module 117 receives 440 an indication from the process management module 115 to accelerate data retrieval for a task being performed by the processing module 117. Such a task may be either an original task or a speculative task. After receiving the indication, the processing module 117 may be required to retrieve an item of data for processing. Thus, the processing module 117 requests 445 greater than the minimum number of stripes required to reconstruct the data item from the distributed storage 122 via the network 123. For example, the processing module 117 may request, in one embodiment, data stripes and redundancy stripes for the data item. In one embodiment, the distributed storage 122 may store multiple copies of the stripes of the data item. In such an embodiment, the processing module 117 may additionally request the copies of the stripes of the data item. Responsive to the request, the processing module 117 receives 450 a stripe of the data item. Upon receiving the stripe, the processing module 117 determines 455 whether a sufficient subset of the requested stripes have been received. Specifically, the processing module 117 determines whether a sufficient subset of stripes has been received to reconstruct the data item. If a sufficient subset of stripes has not been received, the processing module 117 continues receiving stripes. If a sufficient subset of stripes has been received, the processing module 117 reconstructs 460 the data item. Following reconstruction of the data item, the processing module 117 processes 465 the reconstructed data as indicated by the task. Upon completing processing of the task, the processing module 117 provides 470 the results to the process management module 115.

Figure 5A:
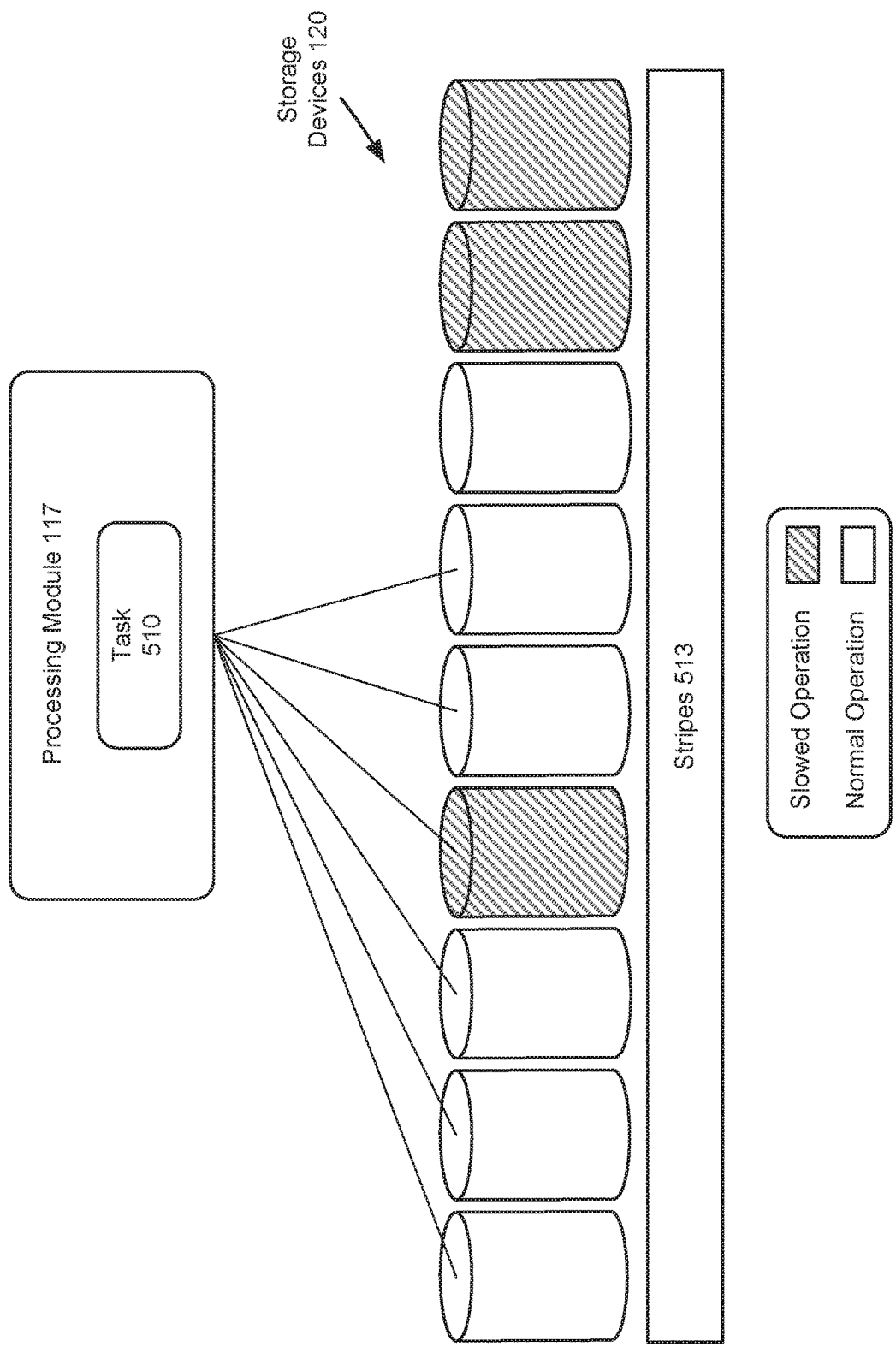
FIG. 5A is a diagram showing an example of a normal data retrieval operation according to one embodiment.

Examples of Managing the Performance of a Distributed System Using Redundancy Information FIGS. 5A, 5B, 5C, 5D, and 5E are diagrams illustrating the management of distributed system performance according to various embodiments. Referring to FIG. 5A, it shows an example of a processing module 117 retrieving a data item for a particular task 510 using a normal data retrieval operation. As shown in FIG. 5A, a data item required by the task 510 is encoded into nine different stripes 513 stored on nine different storage devices 120. The stripes may have been generated by applying a suitable coding algorithm to the data item, such as Shamir's secret sharing algorithm. To retrieve the data item using a normal data retrieval operation, the processing module 117 retrieves the minimum number of stripes needed to reconstruct the data item. For example, the processing module 117 retrieves six of the nine stripes. As shown in FIG. 5A, one of the storage devices 120 is operating slowly. Such may be the case because the storage device 120 has slower hardware characteristics relative to the other storage devices 120, is experiencing a high amount of load, etc. As a consequence, the processing module 117 is unable to reconstruct and process the data item until the processing module 117 receives the stripe stored by the slowed storage device 120. As a result, performance of the task 510 may be delayed while waiting for the stripe.

Figure 5B:
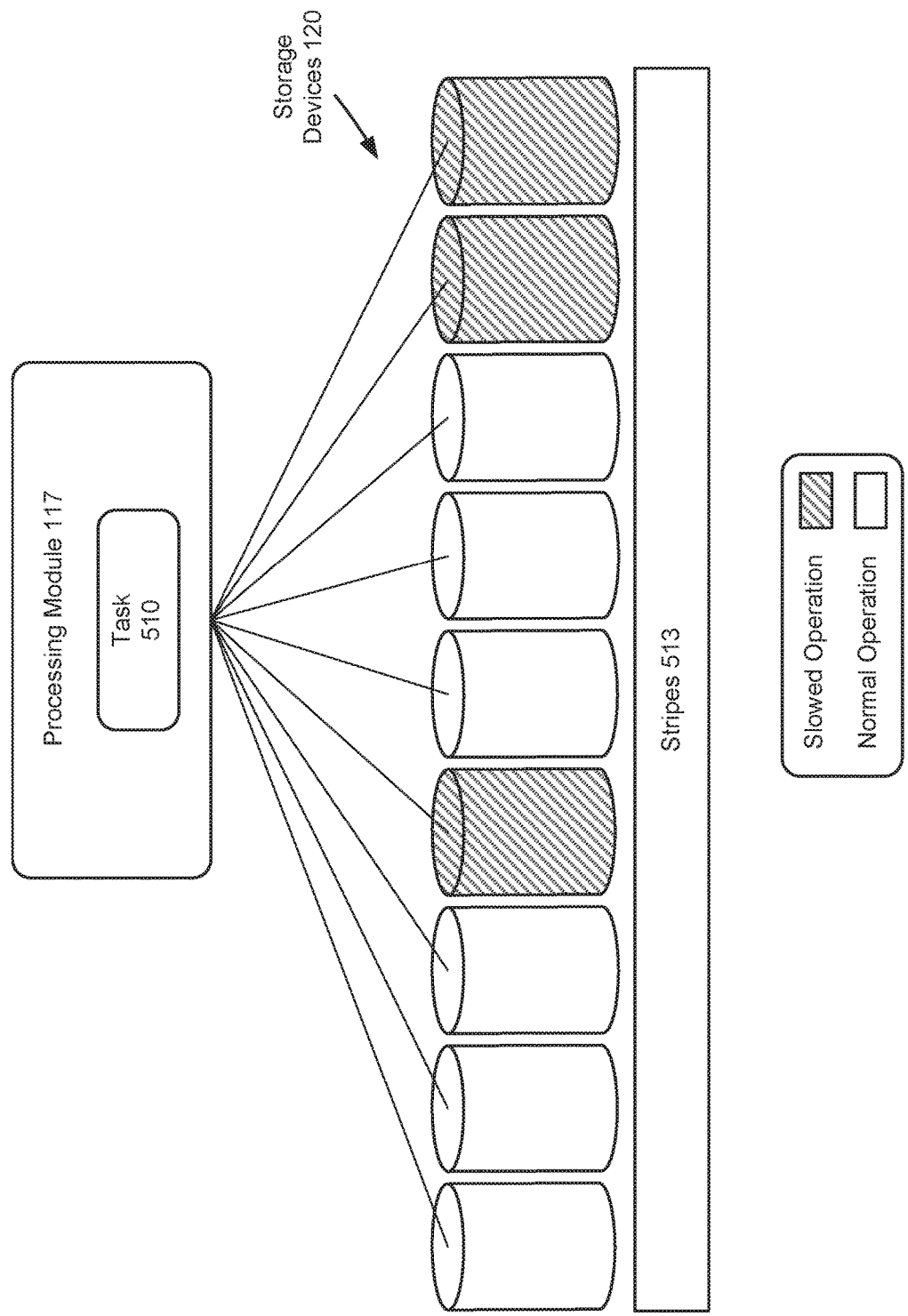
FIG. 5B is a diagram showing an example of an accelerated data retrieval operation according to one embodiment.

Referring now to FIG. 5B, it shows an example of a processing module 117 performing the task 510 using accelerated data retrieval operations according to an embodiment. To perform an accelerated data retrieval operation, the processing module 117 retrieves greater than the minimum number of stripes required to reconstruct the data item. In particular, the processing module 117 requests all nine stripes 513 even though six of the stripes are required to reconstruct the data item. In this way, slowed storage devices that store stripes for the data item do not delay processing of the data item. For example, as shown in FIG. 5B, the processing module 117 is able to receive at least the six stripes necessary to reconstruct the data item without delays due to slowed storage device operation. Hence, the processing module 117 is able to proceed with performing the task 510, which enables the distributed process associated with the task 510 to be completed rapidly without being delayed by the slowed storage device 120.

Figure 5C:
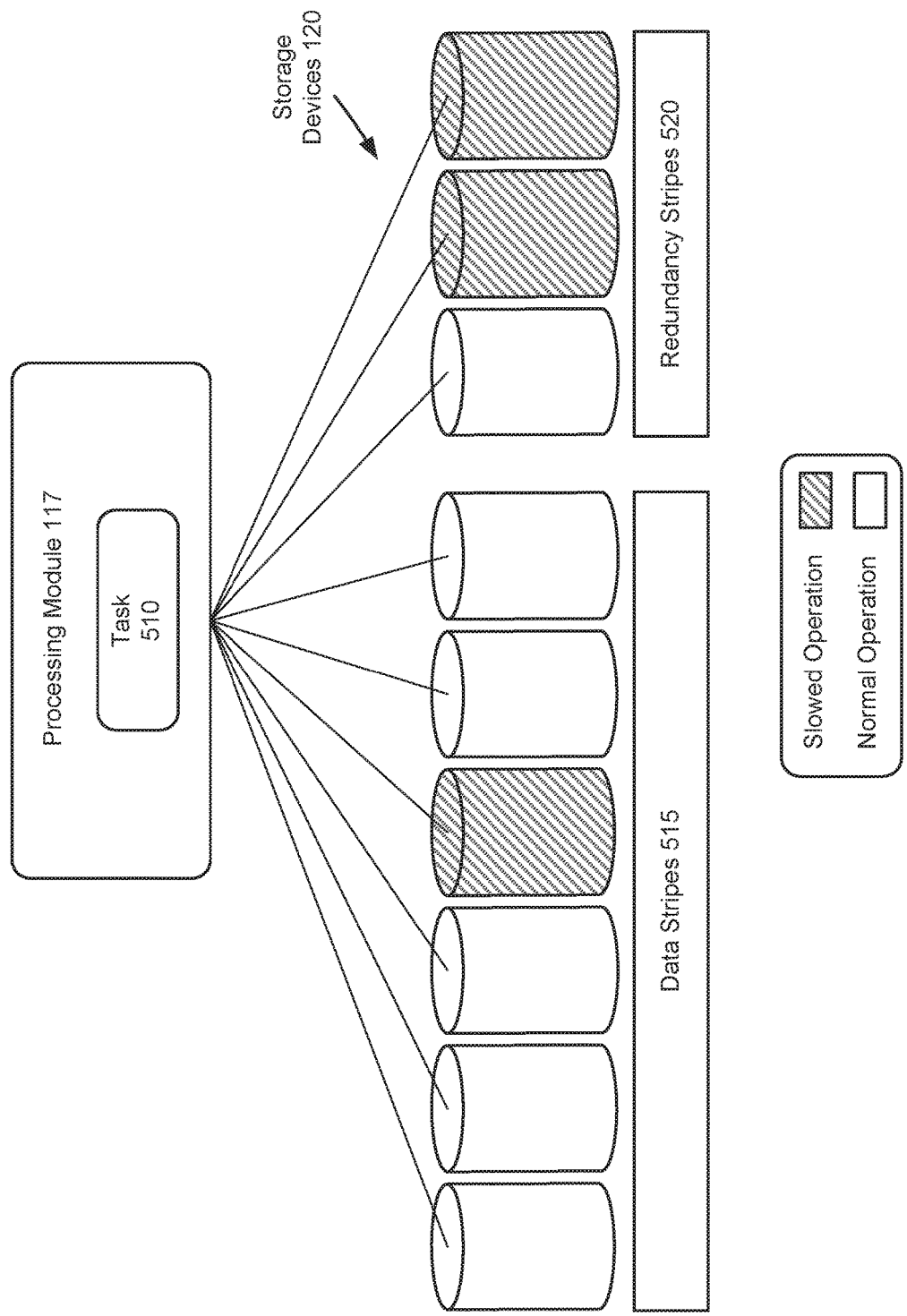
FIG. 5C is a diagram showing an example of an accelerated data retrieval operation according to another embodiment.

Referring now to FIG. 5C, it shows an example of a processing module 117 performing a task 510 using an accelerated data retrieval operation according to another embodiment. FIG. 5C is similar to FIG. 5B except that the encoding algorithm used to generate the stripes of the data item generates a set of data stripes 515 and a set of redundancy stripes 520. To perform an accelerated data retrieval operation, the example shown in FIG. 5C retrieves both the data stripes 515 and the redundancy stripes 520. In contrast, in performing a normal read operation, only the data stripes 515 are retrieved.

Figure 5D:
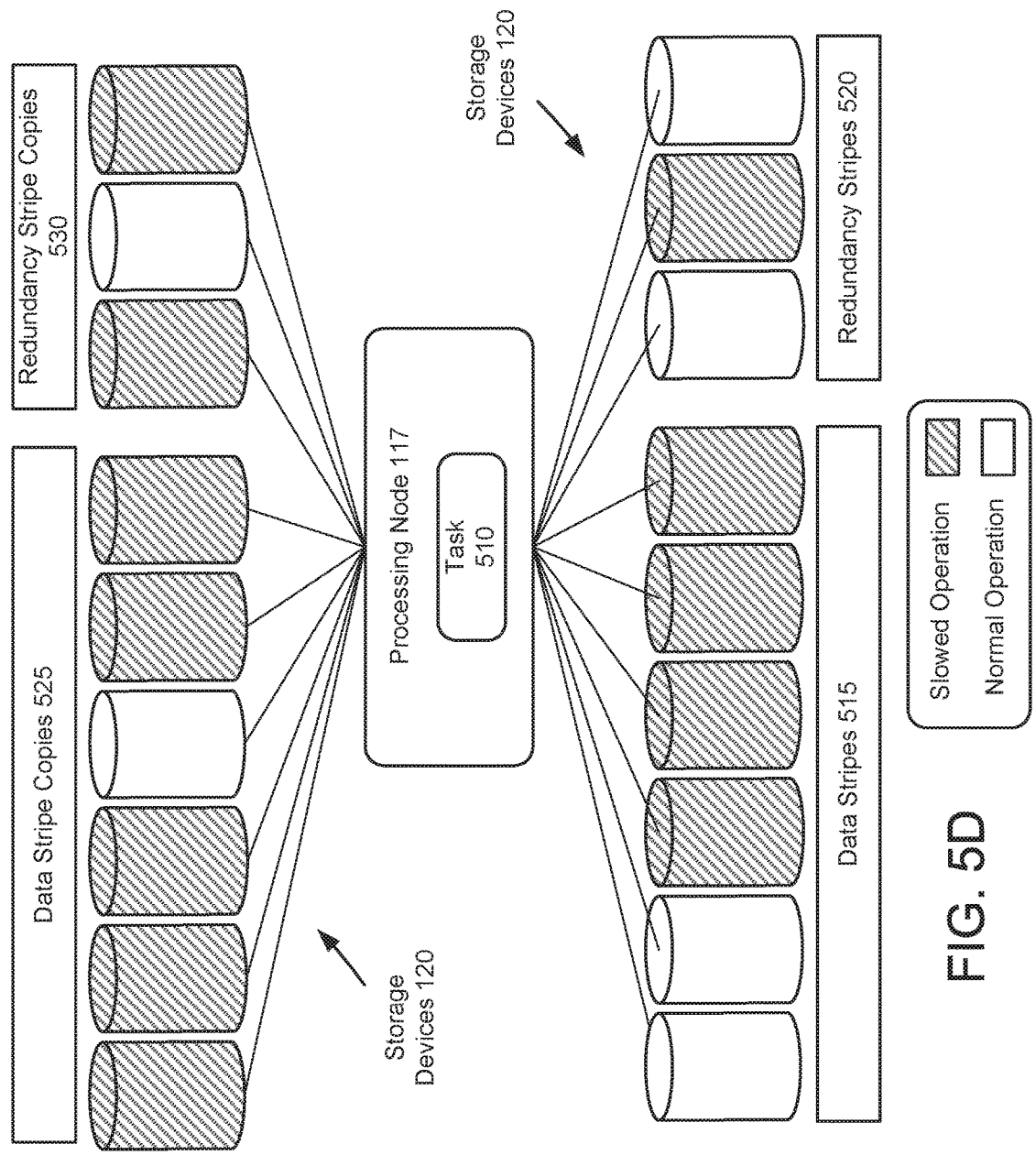
FIG. 5D is a diagram showing an example of an accelerated data retrieval operation according to yet another embodiment.

Referring now to FIG. 5D, it shows an example of a processing module 117 performing a task 510 using an accelerated data retrieval operation according to another embodiment. In FIG. 5D, copies 525 of the data stripes 515 and copies 530 of the redundancy stripes 520 are also shown as being stored in nine different storage devices 120. As shown in FIG. 5D, six of the eighteen storage devices 120 storing the various stripes are operating normally. The six storage devices 120 additionally store different stripes. Thus, the processing module 117 is able to receive six different stripes from the six normally operating storage devices 120 at approximately the same time. Because six different stripes can be obtained fairly quickly, the processing module 117 is able to reconstruct the data item without waiting for stripes from the slowed storage devices 120. As a result, the processing module 117 is able to proceed with performing the task 510, which enables the distributed process including the task 510 to be completed rapidly without being delayed by the slowed storage devices 120.

Figure 5E:
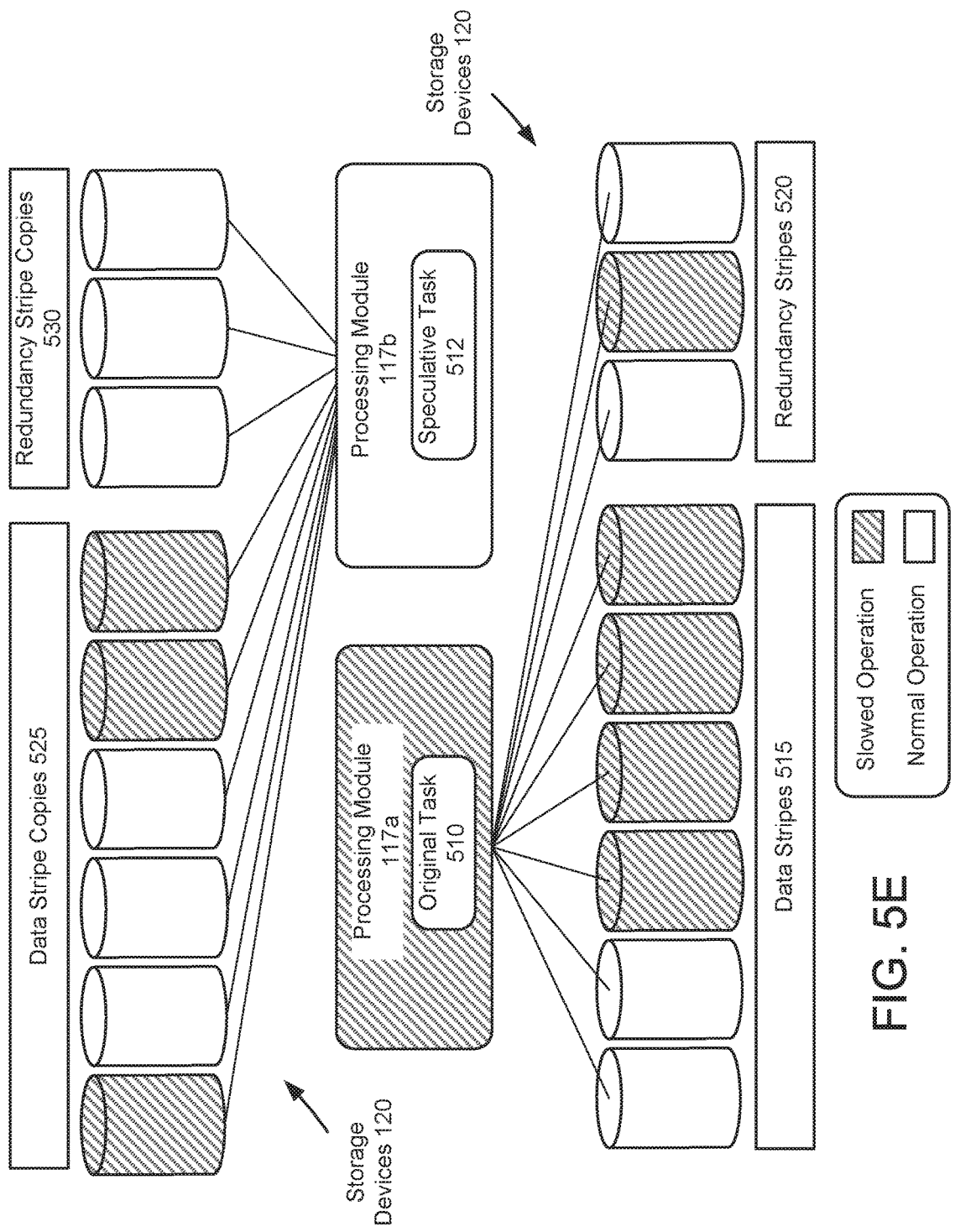
FIG. 5E is a diagram showing an example of an accelerated data retrieval operation according to still another embodiment.

Referring now to FIG. 5E, it shows an example of a processing module 117a performing an original task 510 and a processing module 117b performing a speculative task 512, both using accelerated data retrieval operations according to yet another embodiment. In one aspect, the speculative task 512 is a replica of the original task 510. To perform an accelerated data retrieval operation, the processing module 117a concurrently retrieves the data stripes 515 and the redundancy stripes 520. The processing module 117b, likewise, concurrently retrieves the data stripe copies 525 and the redundancy stripe copies 530. As shown in FIG. 5E, the processing module 117a is performing slowly in addition to a number of the storage devices 120 storing the data stripes 515 and the redundancy stripes 520. However, the processing module 117b is shown as performing normally. Furthermore, six of the nine storage devices 120 storing the various data stripe copies 525 and redundancy stripe copies 530 are operating normally. The aforementioned six normally operating storage devices 120 additionally store different stripes. Thus, the processing module 117b is able to receive six different stripes from the six normally operating storage devices 120 at approximately the same time. Because six different stripes can be obtained fairly quickly, the processing module 117b is able to reconstruct the data item without waiting for the slowed storage devices 120. As a result, the processing module 117b is able to proceed with performing the speculative task 512 and providing the results of performance of the speculative task 512 to the process management module 115 in a timely manner. As a result, the distributed process can be more rapidly completed without delays due to the slowed processing module 117a and storage devices 120.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for managing performance of a distributed storage system, the method comprising:
    storing, in a plurality of storage devices of the distributed storage system, a plurality of stripes associated with a data item, the plurality of stripes generated according to a coding scheme, wherein the coding scheme generates a number of stripes associated with the data item that is more than a minimum number of stripes needed to reconstruct the data item, and wherein the plurality of stripes includes redundancy information for the data item;
    performing a distributed process including a task that requires retrieval of the data item from the distributed storage system; and
    responsive to determining that a processing speed associated with the task does not meet a threshold, performing an accelerated data retrieval operation by:
        requesting more than the minimum number of stripes needed to reconstruct the data item from at least two of the plurality of storage devices of the distributed storage system;
        determining whether at least the minimum number of stripes required to reconstruct the data item has been received; and
        responsive to a determination that at least the minimum number of stripes required to reconstruct the data item has been received, reconstructing the data item using redundancy information.

2. The method of claim 1 wherein:
the plurality of stripes associated with the data item is generated according to an error correction coding scheme.

3. The method of claim 1 wherein:
each stripe in the plurality of stripes comprises redundancy information for the data item.

4. The method of claim 1 wherein:
the plurality of stripes comprises at least one redundancy stripe.

5. The method of claim 1 wherein:
the stripes of the plurality of stripes are each stored on a different storage device of the distributed storage system.

6. The method of claim 1 further comprising:
storing a plurality of copies of the plurality of stripes associated with the data item in the distributed storage system, and
wherein performing the accelerated data retrieval operation further comprises requesting the plurality of copies of the plurality of stripes associated with the data item from the distributed storage system.

7. The method of claim 1 wherein:
the distributed process comprises a plurality of additional tasks, each of the plurality of additional tasks having a respective processing speed, each respective processing speed comprising an amount of data processed by the respective additional task divided by the pre-defined time, an average processing speed of the plurality of additional tasks comprising a sum of the processing speeds of the additional tasks divided by the number of additional tasks; and
the threshold comprises the average processing speed of the plurality of additional tasks.

8. The method of claim 1 wherein:
the distributed process comprises a plurality of additional tasks, each of the plurality of additional tasks having a respective processing speed, each respective processing speed comprising an amount of data processed by the respective additional task divided by the pre-defined time, an average processing speed of the plurality of additional tasks comprising a sum of the processing speeds of the additional tasks divided by the number of additional tasks; and
the threshold comprises a fraction of the average processing speed of the plurality of additional tasks.

9. The method of claim 1 wherein:
the distributed process comprises a plurality of additional tasks, each of the plurality of additional tasks having a respective processing speed, each respective processing speed comprising an amount of data processed by the respective additional task divided by the pre-defined time; and
the threshold comprises a selected additional task's processing speed, the selected additional task selected for having a slowest processing speed of the plurality of additional tasks.

10. A non-transitory computer readable storage medium executing computer program instructions for managing performance of a distributed storage system, the computer program instructions comprising instructions for:
storing, in a plurality of storage devices of the distributed storage system, a plurality of stripes associated with a data item, the plurality of stripes generated according to a coding scheme, wherein the coding scheme generates a number of stripes associated with the data item that is more than a minimum number of stripes needed to reconstruct the data item, and wherein the plurality of stripes includes redundancy information for the data item;
performing a distributed process including a task that requires retrieval of the data item from the distributed storage system; and
responsive to determining that a processing speed associated with the task does not meet a threshold, performing an accelerated data retrieval operation by:
requesting more than the minimum number of stripes needed to reconstruct the data item from at least two of the plurality of storage devices of the distributed storage system;
determining whether at least the minimum number of stripes required to reconstruct the data item has been received; and
responsive to a determination that at least the minimum number of stripes required to reconstruct the data item has been received, reconstructing the data item using redundancy information.

11. The medium of claim 10 wherein:
the plurality of stripes associated with the data item is generated according to an error correction coding scheme.

12. The medium of claim 10 wherein:
each stripe in the plurality of stripes comprises redundancy information for the data item.

13. The medium of claim 10 wherein:
the plurality of stripes comprises at least one redundancy stripe.

14. The medium of claim 10 wherein:
the stripes of the plurality of stripes are each stored on a different storage device of the distributed storage system.

15. The medium of claim 10 wherein the instructions further comprise instructions for:
storing a plurality of copies of the plurality of stripes associated with the data item in the distributed storage system, and
wherein performing the accelerated data retrieval operation further comprises requesting the plurality of copies of the plurality of stripes associated with the data item from the distributed storage system.

16. The medium of claim 10 wherein:
the distributed process comprises a plurality of additional tasks, each of the plurality of additional tasks having a respective processing speed, each respective processing speed comprising an amount of data processed by the respective additional task divided by the pre-defined time, an average processing speed of the plurality of additional tasks comprising a sum of the processing speeds of the additional tasks divided by the number of additional tasks; and
the threshold comprises the average processing speed of the plurality of additional tasks.

17. The medium of claim 10 wherein:
the distributed process comprises a plurality of additional tasks, each of the plurality of additional tasks having a respective processing speed, each respective processing speed comprising an amount of data processed by the respective additional task divided by the pre-defined time, an average processing speed of the plurality of additional tasks comprising a sum of the processing speeds of the additional tasks divided by the number of additional tasks; and
the threshold comprises a fraction of the average processing speed of the plurality of additional tasks.

18. The medium of claim 10 wherein:
the distributed process comprises a plurality of additional tasks, each of the plurality of additional tasks having a respective processing speed, each respective processing speed comprising an amount of data processed by the respective additional task divided by the pre-defined time; and
the threshold comprises a selected additional task's processing speed, the selected additional task selected for having a slowest processing speed of the plurality of additional tasks.

19. A system comprising:
a computer readable storage medium storing processor-executable computer program instructions for managing performance of a distributed storage system, the instructions comprising instructions for:
storing, in a plurality of storage devices of the distributed storage system, a plurality of stripes associated with a data item, the plurality of stripes generated according to a coding scheme, wherein the coding scheme generates a number of stripes associated with the data item that is more than a minimum number of stripes needed to reconstruct the data item, and wherein the plurality of stripes includes redundancy information for the data item;
performing a distributed process including a task that requires retrieval of the data item from the distributed storage system; and
responsive to determining that a processing speed associated with the task does not meet a threshold, performing an accelerated data retrieval operation by:

requesting more than the minimum number of stripes needed to reconstruct the data item from at least two of the plurality of storage devices of the distributed storage system;

determining whether at least the minimum number of stripes required to reconstruct the data item has been received; and responsive to a determination that at least the minimum number of stripes required to reconstruct the data item has been received, reconstructing the data item using redundancy information.

20. The system of claim 19 wherein:

the plurality of stripes associated with the data item is generated according to an error correction coding scheme.

* * * * *